G. A. BURRELL, C. L. VORESS AND V. C. CANTER.
PROCESS AND APPARATUS FOR RECOVERING AND RECONDENSING GASOLENE, NAPHTHA, AND THE LIKE.
APPLICATION FILED JAN. 24, 1921.
1,382,890.
Patented June 28, 1921.
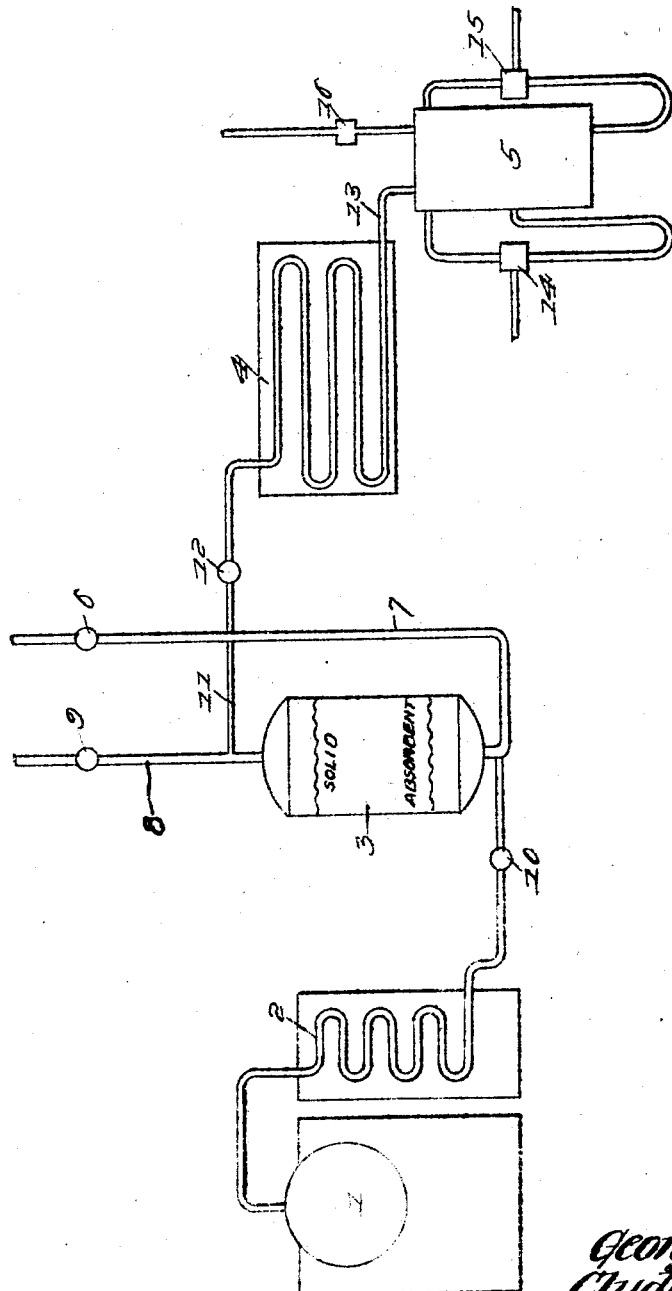

UNITED STATES PATENT OFFICE.

GEORGE A. BURRELL, OF NEW YORK, N. Y., AND CLYDE L. VORESS AND VERNON C. CANTER, OF BRADFORD, PENNSYLVANIA, ASSIGNORS TO GASOLINE RECOVERY CORPORATION, A CORPORATION OF DELAWARE.

PROCESS AND APPARATUS FOR RECOVERING AND RECONDENSING GASOLENE, NAPHTHA, AND THE LIKE.

1,382,890.  Specification of Letters Patent.  Patented June 28, 1921.

Application filed January 24, 1921. Serial No. 439,679.

*To all whom it may concern:*

Be it known that we, GEORGE A. BURRELL, CLYDE L. VORESS, and VERNON C. CANTER, citizens of the United States, whose residences are, respectively, New York, county of New York, and State of New York, Bradford, county of McKean, and State of Pennsylvania, and Bradford, county of McKean, State of Pennsylvania, have invented certain new and useful Improvements in Processes and Apparatus for Recovering and Recondensing Gasolene, Naphtha, and the like; and they do hereby declare the following to be a full, clear, and exact description of the invention, such as will enable others skilled in the art to which it appertains to make and use the same.

This invention relates to an improved process and apparatus for recovering and recondensing gasolene, naphtha, kerosene, benzol, toluol, alcohol, ether, acetone, amyl acetate, ethyl alcohol, propyl alcohol, butyl alcohol, chloroform, carbon tertachlorid, ammonia and formaldehyde or any other substance of commercial value amenable to recovery by this process from a solid absorbent by which it has been absorbed and is being held.

Methods for the separation and recovery of gasolene and other solid absorbent and the subsequent extraction of said vapors from the absorbent by heating said absorbent to drive off the vapors, are known.

The present process contemplates making the distillation under pressure higher than atmospheric when steam is being used as the heating agent. In one of the methods heretofore mentioned, a gaseous mixture, containing the vapors to be recovered, is passed through solid absorbent media which extracts or absorbs the vapors from the mixture. The vapors are subsequently distilled from the absorbent media by introducing superheated steam directly into the absorbent, and the vapors from the gaseous mixture pass off with the steam to the condensers, blenders and separators, which function respectively to condense the gas vapors and steam, blend the condensates formed from the vapors of the gaseous mixtures and separate the aqueous condensate from the gas mixture condensates.

The present invention will be described in connection with the accompanying drawing, which shows a diagrammatic view of the apparatus used with the new process.

The invention consists of making distillations under pressure higher than atmospheric when steam is being used as the heating agent.

Apparatus suitable for practising the process consists of an ordinary steam boiler 1, equipped with a superheater 2, capable of superheating the steam to 550° C., a metal container 3, of any size or shape desired, inclosing a solid absorbent media such as activated charcoal or silica gel, a condenser unit 4 and a separator unit 5.

In the operation, the valve 6 would be opened and a gas or a mixture of gases containing fractions of commercial value, which are amenable to recovery by this process, are allowed to flow through pipe 7 into absorber 3, where it comes into contact with the solid absorbent, which absorbs and retains all or part of the commercial fractions. The remainder of the gas passes out through pipe 8 and valve 9. When any desired quantity of commercial fractions have been retained valves 6 and 9 are closed and steam from boiler 1 superheated in coiled pipe 2 is introduced into absorber 3 by valve 10. In its passage through absorber 3, it vaporizes the commercial fractions held by the solid absorbent and carries them out through pipe 11 and valve 12, into a condenser 4 of any ordinary type, where the steam as well as part of the volatilized vapors are condensed. The uncondensed vapors, the condensed commercial fractions and the water pass by pipe 13 into separator 5, where a gravimetric separation takes place, the valuable product, which in most cases is lighter than water, will flow out through trap 14 and the water out through trap 15. Traps 14 and 15 are ordinary mechanical automatic traps arranged to have the pressure equalized with that in the top of the separator 5. The uncondensed vapors pass out through back pressure regulator 16, which may be set at any desired pressure. By setting this back pressure regulator to discharge at the proper specific pressure, the distillation may be carried out under the pressure desired.

The use of pressure in the distillations has the following advantages:

1. It permits the condensation of lighter vapors than could be otherwise condensed at the same temperature without pressure higher than atmospheric.

2. It permits the use of condensing water of higher temperature than could be efficiently used without pressure higher than atmospheric.

3. It prevents lighter condensates being blown from the apparatus from the outlet prepared for the aqueous condensates.

4. It aids blending.

5. It aids in passing the valuable condensates to storage.

6. It aids in raising the pressure of the uncondensed vapors to a point where they may be placed in outlet lines.

7. It prevents interruption of the separation in the separation tank when fluctuations occur in the uncondensed gas flow.

What we claim and desire to secure by Letters Patent is:—

1. A process of distilling and recondensing vapors from a solid absorbent medium by the use of steam, which consists in distilling the vapors under pressure from said absorbent medium, condensing the vapors, and blending and separating the condensates.

2. A process as set forth in claim 1 in which the vapors are condensed under pressure.

3. A process as set forth in claim 1 in which the condensates are blended and separated under pressure.

4. A process as set forth in claim 1 in which the vapors are condensed under pressure, and wherein the condensates are blended and separated under pressure.

5. A process as set forth in claim 1, wherein the condensed vapors after being blended and separated are caused to form static pressure to maintain the condensates under pressure during distillation.

6. The process of causing pressure greater than atmospheric to be applied to vapors during distillation, condensation, blending and separation while superheated steam is being applied to a solid absorbent for the purpose of distilling out previously absorbed vapors.

7. A process, as described in claim 6, in which the condensation is made under pressure greater than atmospheric.

8. A process, as described in claim 6, in which the blending is made under pressure greater than atmospheric.

9. A process for recovering vapors from gaseous mixtures containing the same, which consists in contacting the mixture containing the vapors with a solid absorbent, and separating the vapors from the absorbent by pressure distillation.

10. A process for recovering vapors from gaseous mixtures containing the same, which consists in contacting the mixture containing the vapors with a solid absorbent which extracts the vapors from the mixture, introducing steam into said absorbent to distil off the vapors, conducting the vapors from the gaseous mixture and the steam away from said absorbent, condensing the major portion of said vapors, separating the condensates from the vapors of the gaseous mixture from the aqueous condensate, and maintaining the vapors under pressure from the start of distillation to the separating of the condensates.

11. An apparatus for recovering vapors from gaseous mixtures containing the same comprising an absorption tower, means for introducing a gaseous mixture containing the vapors to said tower, means for discharging the gaseous mixture from the tower, means for generating and introducing steam into said tower to distil vapors from the same, a condenser operatively connected with the tower, and designed to receive vapors from the latter, a blending and separating device operatively connected with the condenser and receiving condensates and uncondensed vapors from the latter, and means for maintaining pressure in said tower, condenser and blending and separating device.

In testimony whereof we affix our signatures.

GEORGE A. BURRELL.
CLYDE L. VORESS.
VERNON C. CANTER.